(12) United States Patent
Agin

(10) Patent No.: US 7,295,856 B2
(45) Date of Patent: Nov. 13, 2007

(54) METHOD OF AND A DEVICE FOR CONTROLLING AN OUTER LOOP FOR ADJUSTING THE TARGET VALUE OF AN INNER POWER CONTROL LOOP

(75) Inventor: Pascal Agin, Sucy en Brie (FR)

(73) Assignee: Evolium S.A.S., Paris (FR)

( * ) Notice: Subject to any disclaimer, the term of this patent is extended or adjusted under 35 U.S.C. 154(b) by 400 days.

(21) Appl. No.: 10/428,846

(22) Filed: May 5, 2003

(65) Prior Publication Data
US 2004/0082301 A1  Apr. 29, 2004

(30) Foreign Application Priority Data
May 7, 2002  (FR) .................. 02 05752

(51) Int. Cl.
*H04B 7/00* (2006.01)
(52) U.S. Cl. .............. 455/522; 455/69; 455/450; 370/329
(58) Field of Classification Search .......... 455/552.1, 455/69, 450, 522; 370/329, 342
See application file for complete search history.

(56) References Cited
U.S. PATENT DOCUMENTS
6,101,179 A * 8/2000 Soliman .......... 370/342
6,175,586 B1 * 1/2001 Lomp .............. 375/130
6,374,118 B1   4/2002 Toskala et al.
6,983,166 B2 * 1/2006 Shiu et al. ......... 455/522

FOREIGN PATENT DOCUMENTS
EP  1067704 A2  1/2001
EP  1164714 A1  12/2001

* cited by examiner

Primary Examiner—Edward F. Urban
Assistant Examiner—Christian A. Hannon
(74) Attorney, Agent, or Firm—Sughrue Mion, PLLC

(57) ABSTRACT

A device controls an outer loop (5) for controlling the adjustment of a primary target value (SIRc) of an inner power control loop in a multiservice telecommunications installation. The external control loop (5) feeds the inner loop with the primary target value (SIRc) corresponding to a service. The device includes control means (9) adapted, if there are at least two different services in the installation, to select one service dynamically and as a function of a selected criterion so that the outer loop can determine a primary target value (SIRc) corresponding to the selected service.

26 Claims, 1 Drawing Sheet

Figure 1:
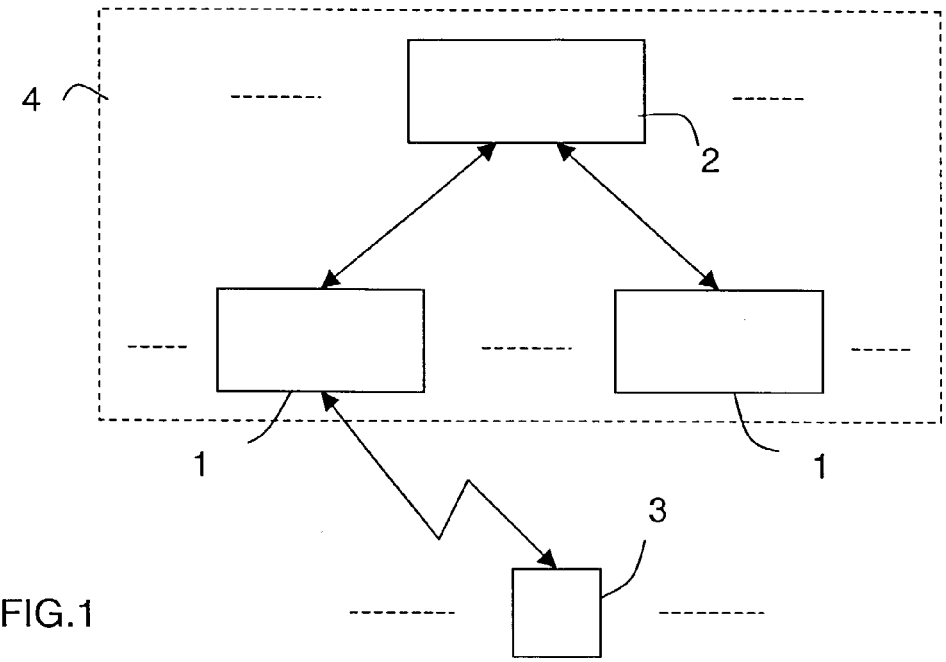

METHOD OF AND A DEVICE FOR CONTROLLING AN OUTER LOOP FOR ADJUSTING THE TARGET VALUE OF AN INNER POWER CONTROL LOOP

The field of the invention is that of telecommunications installations and in particular code division multiple access (CDMA) telecommunications installations.

CDMA installations, for example Universal Mobile Telecommunications System (UMTS) installations, offer many services, for example exchanging audio and/or video data and browsing pages of data or sites (i.e. switching data packets). To enable the simultaneous exchange of different types of service data, whilst distinguishing between them (for example through different priority levels or different qualities of service), each type is associated with a transport channel. The transport channels are first subjected to various kinds of processing, such as channel coding and interleaving, and are then time division multiplexed to form what the person skilled in the art generally refers to as a coded composite transport channel (CCTrCh), which then feeds one or more physical channels at a given power.

Thus all service data is delivered on physical channels at the same power, regardless of its type. As mentioned above, different types of service may be associated with different qualities of service. For example, a voice call service has a quality indicator known as the bit error rate (BER) that is equal to approximately $10^{-3}$, whereas a circuit switching service has a BER of approximately $10^{-6}$. Different power levels are generally required to achieve the different qualities of service (QoS).

It can happen that a number of multiplexed services have substantially identical qualities of service but require different power levels at a given time, because of their characteristics (for example their bit rate or error correction coding).

The power level is generally set by an inner power control loop on the basis of a (primary) target value SIRC for the signal-to-interference ratio (SIR). In other words, the inner loop adjusts the transmission power as a function of the target value SIRc. Coupling the inner loop to an outer power control loop to enable adjustment of the target value SIRc as a function of the service to be initiated has already been proposed. Outer loops of this kind are described in patent documents WO 99/05808, DE 199 30 747, WO 01/01600 and FR 01/07690, for example.

When a service, or one service from a combination of services, has been selected, the outer power control loop is activated for that service only. The outer loop then determines the minimum (primary) target value that will enable the quality of service associated with the selected service to be achieved. Activation can be effected either only on setting up a call or whenever a new service is requested, if the new service requires a higher power level. The single service is therefore selected at the beginning of a call, and thus a priori on the basis of simulations or physical measurements.

This situation is unsatisfactory in that, because several services and combinations of services can be envisaged (for example AMR, PS at 64 kbit/s, PS at 128 kbit/s, PS at 384 kbit/s, AMR and PS at 64 kbit/s, AMR and PS at 128 kbit/s, AMR and PS at 384 kbit/s, PS at 64 kbit/s, PS at 384 kbit/s), it is particularly difficult to determine which service in each combination requires the highest power, given all the qualities of service required. This is all the more difficult in that, for a given combination of services, the service that requires the highest power is generally closely dependent on the qualities of service required for the other services of the combination.

Moreover, some auxiliary parameters, such as the channel coding type, and more generally the environment in which the data circulates, can influence the power level required for a service to achieve the target quality of service. Outer loops cannot take account of these auxiliary parameters.

Thus in the existing state of the art, outer loops are not suitable for services coexisting substantially simultaneously in the same network.

An object of the invention is to remedy some or all of the above-mentioned drawbacks.

To this end, the invention proposes a method of controlling an outer loop for controlling the adjustment of a primary target value for an inner power control loop in a telecommunications installation, the outer loop feeding the inner loop with a primary target value corresponding to a service.

The method is characterized in that, if there are at least two different services in the installation, one service is selected dynamically and as a function of a selected criterion so that the outer loop can determine a primary target value corresponding to the selected service.

The terms "service" and "transport channel" are used interchangeably here. However, it should noted that the same service can use different transport channels (TrCH). For example, for speech using adaptive multirate (AMR) coding, three transport channels are generally used, respectively for bits of classes A, B and C, corresponding to bits having different levels of importance. It should also be noted that it is possible for no quality of service to be indicated for a given transport channel. For example, in the AMR situation, the aim is generally to achieve a bit error rate of $10^{-3}$ for the transport channel carrying only class A bits. However, even if no quality of service is imposed, a quality of service can be set in a more or less arbitrary manner.

Consequently, the word "service" here covers the various situations in which a particular (target) quality of service must be achieved for a particular transport channel, independently of how the services and the transport channels are defined. An important application example is the situation in which a connection using AMR coding and a packet mode connection (in particular a 384 kbit/s packet mode connection) exist simultaneously. In this case, five transport channels (also known as dedicated channels (DCH)) can be used, for example: three channels for the AMR bit classes, one channel for the packet connection, and an additional channel, usually employed for signaling. A quality of service indicator (such as the block error rate (BLER)) can then be estimated only for the transport channel carrying the AMR class A bits and for the transport channel used for the packet mode connection (and thus for only two of the four transport channels).

Consequently, the conventional dynamic adjustment of the parameters of the outer loop applies only to the transport channels for which the quality of service indicator can be estimated. Thus a reference service is selected dynamically from the services for which the quality of service can be estimated and is then used in the outer loop. With BLER, for example, this is possible only for transport channels which use a CRC.

Generally speaking, the reference service can be selected from a subset of transport channels.

The invention therefore enables the (type of) service to which the outer loop applies to be selected dynamically.

In an advantageous embodiment, each service is associated with one or more tertiary target values (that can be representative of a target quality of service) and one or more associated tertiary quality indicators (that can be representative of an estimated quality of service) and the selection criterion for each service that has not achieved its target quality of service consists in calculating the (positive or negative) difference between its tertiary target value and its tertiary quality indicator and retaining the service having the larger or largest difference.

In other words, only services that have not achieved their target quality of service are considered, and the service requiring the higher of highest power is retained.

The invention applies to any type of outer loop and to any type of inner loop, and in particular to outer loops that feed inner loops using first and second secondary quality indicators respectively associated with first and second secondary target values.

The method of the invention can also include a stage of the outer loop determining the primary target value corresponding to the selected service that is to feed the inner loop.

The outer loop preferably determines the primary target value periodically.

In the method of the invention, service selection is preferably effected periodically, but could equally well be effected on demand.

When the method is periodic, the service selection frequency and the primary target value determination frequency can be the same or different. If these frequencies are different, it is preferable for the determination frequency to be higher than the selection frequency. In other words, it is preferable for determination of the primary target value by the outer loop to be effected more often than service selection.

The invention also proposes a device for controlling an outer loop for controlling the adjustment of a primary target value of an inner power control loop in a telecommunications installation, the external control loop being adapted to feed the inner loop with a primary target value corresponding to a service.

The device is characterized in that it includes control means adapted, if there are at least two different services in the installation, to select one service dynamically and as a function of a selected criterion so that the outer loop can determine a primary target value corresponding to the selected service.

In an advantageous embodiment, each service is associated with one or more tertiary target values (for example representative of a target quality of service) and one or more estimated qualities of service (for example representative of an estimated quality of service) and the control means are adapted to effect said selection on the basis of a selection criterion for each service that has not achieved its target quality of service consisting firstly in calculating the (positive or negative) difference between its tertiary target value and its tertiary quality indicator and retaining the service having the larger or largest difference.

The control means of the device can be used to feed any type of outer loop coupled to any type of inner loop, and in particular an outer loop that feeds an inner loop with a primary target value determined from first and second secondary quality indicators associated with first and second secondary target values.

The device of the invention can also include the outer loop, in which case it constitutes an integrated device that can be coupled to an inner loop.

Whether it is integrated into the device or not, the outer loop is preferably adapted to determine the primary target value periodically.

The control means are preferably adapted to select services periodically. They could equally well make the selection on demand, however.

If processing is periodic, the service selection frequency and the primary target value determination frequency can be the same or different. If these frequencies are different, it is preferable for the determination frequency to be higher than the selection frequency. In other words, it is preferable for primary target value determination by the outer loop to be more frequent than service selection by the control means.

For both the device and the method, it is advantageous to choose the secondary and tertiary quality indicators from a group including the bit error rate (BER), the block error rate (BLER), and the raw BER (and in particular the raw BER consisting of the transport channel BER and the physical channel BER).

The invention further proposes a mobile station (for example a user equipment) and a telecommunications network equipment (for example a base station, such as a UMTS Node B, or a base station controller, such as UMTS radio network controller (RNC)) including a device of the type described above.

The device, the station, the equipment and the method of the invention are particularly, although not exclusively, suitable for code division multiple access (CDMA) telecommunications installations, and in particular UMTS installations.

Figure 2:
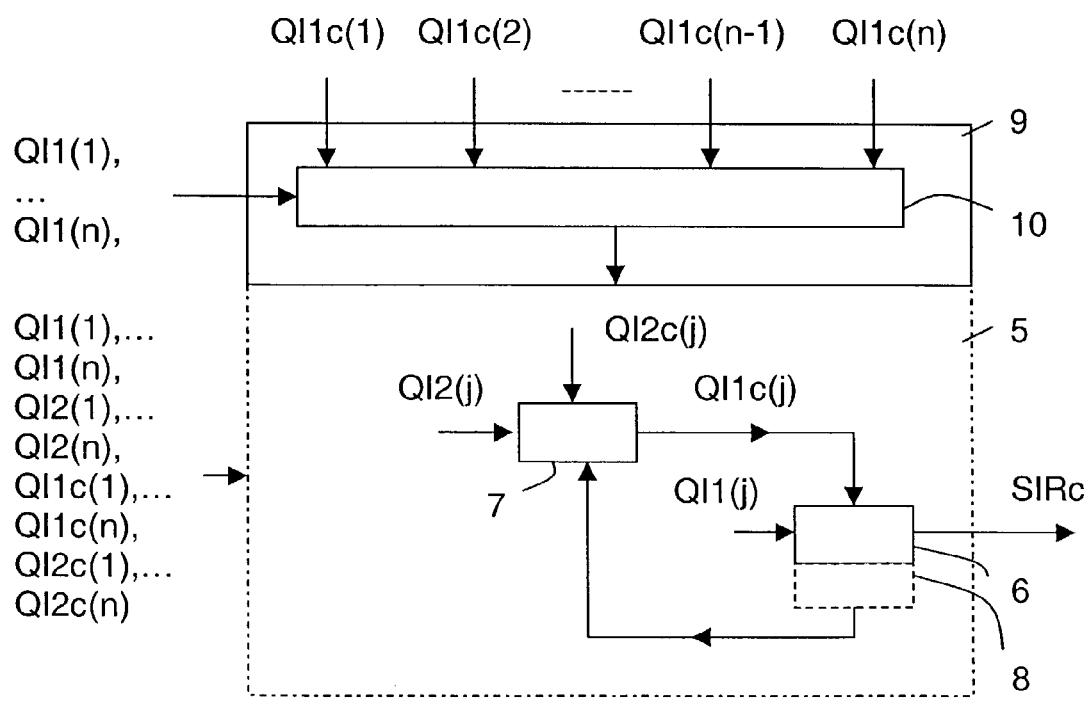

Other features and advantages of the invention become apparent in the course of the following detailed description and from the accompanying drawings, in which:

FIG. 1 is a diagram showing the general architecture of a UMTS mobile telecommunications installation, and FIG. 2 is a diagram showing one embodiment of a device of the invention.

The drawings are for the most part of a specific nature and consequently constitute part of the description of the invention as well as, if necessary, contributing to the definition of the invention.

Reference is made first to FIG. 1 for a description of one example of a telecommunications installation in which a device and a method of the invention can be used. The following description considers, by way of illustrative example, a Universal Mobile Telecommunications System (UMTS) telecommunications installation.

The telecommunications installation comprises fixed base stations 1, base station controllers 2, and telecommunications stations 3, some of which are mobile stations. In the UMTS, a base station is known as a Node B, a base station controller is known as a radio network controller (RNC), a telecommunications station is known as a user equipment, and the combination 4 of the base stations 1 and the RNC 2 is known as the UMTS terrestrial radio access network (UTRAN).

The stations 3 exchange data, in particular data of services of different types, generally via and with the base stations 1, and in particular for updating information and for connecting to processing and service terminals. Some mobile stations 3 connected to a UTRAN can also communicate with a fixed station (or terminal), i.e. one that is not connected to a UTRAN.

The controllers 2 control the network and the actions of the stations 3, while the base stations 1 are primarily transceivers.

The services offered by the installation are associated with different qualities of service (or quality indicators (QI)) that are defined by error rates after channel decoding, for example, such as the bit error rate (BER), the block error rate (BLER), and the frame error rate (FER). An error rate before channel decoding can also be used, such as the raw BER, or preferably the transport channel BER and the physical channel BER, which are metrics that can be reported by a Node B to an RNC. These qualities of service and quality indicators are described in the document TS 25.215 V3.8.0 (2001-09) published by the 3rd Generation Partnership Project (3GPP)—Technical Specification Group Radio Access Network—Physical Layer—Measurements (FDD).

The device of the invention shown in FIG. 2 is for controlling the outer loop 5 for controlling the adjustment of the (primary) target value of an inner loop (not shown) for controlling the power of the installation.

The function of the inner power control loop in an installation is, for each connection between a base station 1 and a station 3, to maintain a parameter representative of transmission quality, such as the signal-to-interference ratio (SIR), as close as possible to a (primary) target value SIRc. An SIR that is too high increases interference in the installation and therefore degrades the performance of the installation, while an SIR that is too low degrades the quality of service for the link concerned. Controlling the SIR in an installation is therefore particularly important. It can be effected as described hereinafter, for example.

In the uplink direction (from the station 3 to the base station 2), the base station 2 estimates the SIR periodically and compares it to the target value SIRc. If the estimated value of the SIR is less than the target value SIRc, the base station 2 requests the station 3 to increase its transmission power. Otherwise, if the estimated value of the SIR is greater than the target value SIRC, the base station 2 requests the station 3 to reduce its transmission power.

Because the target value SIRc is selected as a function of the required quality of service, and because this varies at each change of service, it is necessary to modify its (primary) value frequently to adapt the transmission to the current type of service.

The outer loop 5 is provided for this purpose. Generally speaking, the function of an outer loop is to adjust the target value SIRc so that the required quality of service is achieved using the lowest possible power level. To be more precise, its function is to compare, generally periodically, the current quality of service (or a quality indicator representative thereof) to the required (target) quality of service which corresponds to the service to be initiated and to which it is "locked". If the current (or estimated) quality of service is lower than the target quality of service associated with the service to be started, the outer loop 5 increases the target value SIRc of the inner loop. Otherwise, if the estimated quality of service is higher than the target quality of service, the outer loop 5 reduces the target value SIRc of the inner loop.

As described in more detail later, the outer loop 5 can, for example, control the target value SIRc on the basis of one or more quality indicators (QI) generally selected from those referred to above (BER, BLER, FER and raw BER (and in particular the transport channel BER and the physical channel BER, which are metrics that can be reported by a Node B to a RNC)).

The transport channel BER and the physical channel BER are two particular examples of a raw BER that can be used with advantage in the UMTS. The raw BER is the error rate before channel decoding. It is generally estimated by the receiver comparing the data received before error corrector decoding and the corresponding data obtained after error corrector decoding and recoding using the same error corrector code as the transmitter.

The target value SIRc is therefore closely related to the quality indicators (QI), which in turn are representative of the quality of service that corresponds to the service to be started.

Each station 3 is preferably equipped with an external control loop 5 so that it can estimate the quality needed to interpret the data received on its data receive (downlink) portion. Similarly, each RNC 2 is preferably equipped with an external control loop 5 so that it can estimate the quality necessary for transmitting data on its transmit (uplink) portion.

Part of the inner loop is integrated into each station 3 and another part into each base station 1. Thus in the uplink direction a base station 1 can estimate the quality of service (primary quality indicator, such as the SIR, associated with received service data) and compare it to a target quality of service (primary target quality indicator, such as the target value SIRc) that corresponds to the type of service, and send the sending station 3 a transmission power control command, whereupon the station 3 modifies its transmission power in accordance with the command sent by the base station 2.

As indicated above, the device of the invention is adapted to control the outer loop 5 so that it delivers to the inner loop a target value SIRc that, as often as possible, is appropriate for the services that coexist in the network. To be more precise, in the presence of multiple services (of at least two different types), the device is designed to select one service dynamically, in accordance with a selected criterion, so that the outer loop 5 is able to determine a corresponding primary target value SIRc.

As explained later, many selection criteria can be used, what is important being that they allow selection at a given time, from the services that have not yet achieved their target quality of service, of the service whose associated estimated quality of service is farthest away from its target quality of service.

The device can be coupled to many types of outer loop 5, independently of the type of inner loop used. It can also integrate the outer loop 5, as shown in FIG. 2.

There follows a description with reference to FIG. 2 of a particular example of a two-stage outer loop 5. Because this kind of outer loop is described in detail in the patent document FR 01/07690, only its main functions are described here.

The outer loop 5 includes a first stage 6 adapted to deliver to the inner loop a primary target value SIRc derived from a first secondary target value QI1$c$ and a first secondary quality indicator QI1 whose value has been estimated in the installation.

The outer loop 5 also includes a second stage 7 adapted to deliver to the first stage 6 the first secondary target value QI1$c$ derived from a second secondary quality indicator QI2 whose value has been estimated in the installation and a second secondary target value QI2$c$.

If the value QI2 is less than the value QI2$c$, the current value QI1$c$ is increased by an amount $\delta2_{up}$. Otherwise, if the value QI2 is greater than the value QI2$c$, the current value QI1$c$ is reduced by an amount $\delta2_{down}$.

If the value QI1 is less than the value QI1$c$, the current value SIRc is increased by an amount $\delta1_{up}$. Otherwise, if the value QI2 is greater than the value QI2$c$, the current value SIRc is reduced by an amount $\delta1_{down}$.

The quality indicators QI$i$ ($i=1, 2$) are preferably selected from those referred to above (BER, BLER, FER and raw BER (and in particular the transport channel BER and the physical channel BER)). However, there could be other indicators, provided that they are representative of a quality of service in the installation.

The first and second secondary quality indicators QI1 and QI2 are preferably different. They could be the same, however, although this is of no real benefit in a two-stage outer loop.

The value QI2 is generally a quality indicator specified at call set-up time and corresponding to the required (target) quality of service. This indicator is not always appropriate. It is generally the BER or the BLER. Otherwise, a more precise indicator QI1 representative of transmission quality is generally selected, for example the raw BER.

In a variant shown in dashed outline in FIG. 2, the first stage 6 includes a coupling module 8 coupling it to the second stage 7, and the first target value QI1$c$ is adjusted only when the first stage 6 has already converged.

To be more precise, it is a matter of making processing more stable by preventing the values QI1$c$ and SIRc from being increased or reduced without being affected by the values QI1 and SIR, respectively. This can be achieved as follows:

if $|QI1-QI1c|<\eta$, and if QI2<QI2$c$, then QI1$c$ is increased by an amount $\delta 1_{up}$, or if QI2>QI2$c$, then QI1$c$ is reduced by an amount $\delta 1_{down}$ if $|QI1-QI1c|>\eta$, no action is taken.

As shown in FIG. 2, the device of the invention includes a control module 9 that receives from the installation data representative of services that coexist within it. The data comprises, for example, tertiary target quality indicators (QI1$c$(j), j=1 to n) associated with n different qualities of service corresponding to n different services coexisting in the installation. The tertiary target quality indicators (QI1$c$(j)) can be accompanied by tertiary quality indicators (QI1(j), j=1 to n) that have just been estimated.

These tertiary quality indicators are preferably selected from those referred to above (BER, BLER, FER and raw BER (and in particular the transport channel BER and the physical channel BER)). There could be other indicators, however, provided that they are directly or indirectly representative of a quality of service in turn representative of a service of the installation.

In the present example, these indicators are first estimated tertiary quality indicators QI1(j) and first tertiary target quality indicators QI1$c$(j), for example of the raw BER type. However, they could equally well be second estimated quality indicators QI2(j) and second target quality indicators QI2$c$(j), for example of the BER or BLER type, or quality indicators different from those used by the outer loop 5.

An outer loop could also be used for adjusting the target value SIRc on the basis of received data blocks. This variant of the outer loop uses the BLER for Q2. If the block received is correct (BLER=0), the target value SIRc is reduced, and if the block received is not correct (BLER=1), the target value SIRc is increased.

The control module 9 includes a calculation module 10 for acting dynamically, for a given link, at a given time, in a controlled fashion, and in accordance with a selected criterion, to select the type of service requiring the highest transmission power and therefore the highest quality of service (associated with the highest target value SIRc), for example.

This selection can be based on a number of criteria. In a first embodiment, for example, the calculation module 10 receives (tertiary) target quality of service values associated with the services and the estimated (current) value of the quality of service. It then determines from all the services those that have not achieved their target quality of service, i.e. those that necessitate the highest power.

The above expression "that have not achieved their target quality of service" must be understood within the terms of the definition that is given above. It is a matter of determining which services require more power than others to achieve their target quality of service (QoS). To this end, it is possible to choose the service that maximizes |QoS−QoS_target| from all the services satisfying the condition QoS>QoS_target or the converse condition QoS<QoS_target, depending on the type of quality of service indicator selected. For example, if the quality of service indicator selected is the raw BER, the BER or the BLER, the condition QoS>QoS_target is used. Otherwise, if the quality of service indicator selected is, for example, Q1=−raw BER, then the condition QoS<QoS_target is used. Consequently, the above expression "that have not achieved their target quality of service" designates services that satisfy one of the above two conditions, for example.

The calculation module 10 therefore calculates, for the services retained, the (positive or negative) difference between the value of their target quality of service and the current value of their quality service, in order to retain the service with the greatest difference that meets one of the above-mentioned conditions. In other words, the selected service is the service that requires the highest power at a given time to achieve its target quality of service, given the current power (or the current value of the quality indicator, which corresponds thereto).

Introducing the concept of a threshold can be envisaged to prevent too frequent changes of service, due in particular to small (positive or negative) differences.

The control module 9 then sends the outer loop 5 data representative of the service that has just been selected by the calculation module 10, so that it is able to determine an inner loop target value SIRc suitable for the selected service. To be more precise, in this example, the outer loop 5 determines from the first and second estimated and secondary target indicators (QI1, QI1$c$; QI2, QI2$c$) that it receives from the installation those that correspond to the selected service, and then feeds its first and second stages 6, 7 with the indicators determined in this way.

Of course, the outer loop 5 could adjust the target value SIRc on the basis of a single estimated secondary quality indicator and a single secondary target quality indicator, or in any other way.

In a second embodiment, the calculation module 10 receives tertiary target quality indicators associated with the various services as well as the first estimated tertiary quality indicators. In the following example, selection is effected with the aid of a single tertiary target indicator (the first one, QI1$c$), but it could equally well be effected with the aid of any other tertiary target indicator, for example QI2$c$.

The calculation module 10 determines the services that have not achieved their target quality of service, i.e. those necessitating more power. For these services, it calculates the difference $\Delta(j)$ between its (first) tertiary target quality indicator QI1$c$(j) and its (first) estimated tertiary quality indicator QI1(j). It then compares the differences $\Delta(j)$ and retains the service having the greatest difference that satisfies one of the above-mentioned conditions. In other words, it selects the service that requires the highest power, at a given time, to reach the value of its target quality indicator, given the current value of the corresponding quality indicator.

The concept of a threshold can be introduced to avoid too frequent changes of service, based in particular on small (positive or negative) differences.

The control module 9 then sends the outer loop 5 data representative of the service that has just been selected by its calculation module 10, in order for it to determine an inner loop target value SIRc suitable for the service selected. To be more precise, the outer loop 5 determines from the first and second secondary estimated and target quality indicators (QI1, QI1c; QI2, QI2c) that it receives from the installation those that correspond to the selected service and then feeds its first and second stages 6, 7 with the indicators determined in this way.

Of course, the outer loop 5 could adjust the target value SIRc using a single secondary estimated quality indicator and a single secondary target quality indicator.

As mentioned above, the variable(s) used to select the service that requires the greatest power at a given time can be indirectly representative of the quality of service, as is normally the case with quality indicators in general, and more particularly with raw BER. However, these variable(s) can equally well be directly representative of the quality of service (QoS), as is the case with the BLER, for example.

Moreover, it is not essential for the (tertiary) quality indicator(s) QI used to select the service that requires the highest power at a given time to be identical to the (secondary) quality indicators used by the outer loop 5.

The control module 9 preferably effects selection periodically. However, this is not essential. It is possible to envisage the module 9 effecting selection only in response to receiving a specific instruction.

In the case of periodic selection, two different periods can be envisaged, a first concerning the selection of the service to be initiated and the second concerning the determination by the outer loop 5 of the target value SIRc corresponding to the selected service. These two periods can be the same or different. If they are different, it is preferable for the second period (that for determining the target value SIRc) to be shorter than the first period (the selection period). This avoids activating the outer loop 5 in each period with a new service, which would compel it to make a new determination of the target value SIRc, rather than simply adjusting the previous value. This could cause the outer loop 5 to diverge.

As mentioned above, the device of the invention can comprise only the control module 9, but can equally well consist of the combination of an outer loop 5 and a control module 9.

Consequently, when the device consists of the abovementioned combination, it can be installed in each station 3 of the installation and in each RNC 2. Otherwise, it can be installed in any equipment of the installation, provided that the equipment has access to the data exchanged, and in particular in the stations 3, the controllers (RNC) 2, the base stations 1, or a dedicated unit independent of a station 3, a station (Node B) 1 or an RNC 2 (although this is not particularly advantageous).

The control module 9 (and the calculation module 10) of the device of the invention and/or the outer loop 5 can take the form of one or more software modules. However, they can equally well, at least in part, take the form of electronic circuits (hardware), or consist of a combination of software modules and electronic circuits.

The invention also provides a method of controlling an outer loop for controlling the adjustment of a primary target value, for example a target value SIRc, of an inner power control loop of a multiservice telecommunications installation, the outer loop 5 delivering to the inner loop a primary target value corresponding to a service.

This method can be implemented using the device described above. The main and optional functions and sub-functions provided by the steps of the method being substantially identical to those provided by the various means constituting the device described above, only the steps implementing the main functions of the method of the invention are described hereinafter.

When there are at least two different services in the installation, the method of the invention consists in dynamically selecting one service as a function of a selected criterion and the outer loop 5 determines a primary value corresponding to the service selected.

In an advantageous embodiment, each service can be associated with one or more tertiary target values (which can be representative of a target quality of service) and one or more associated tertiary quality indicators (which can be representative of an estimated quality of service). In this case, the selection criterion for each service that has not achieved its target quality of service can consist in calculating the (positive or negative) difference between its tertiary target value and its tertiary quality indicator and retaining the one for which the difference is the larger or largest.

The method of the invention can also include a stage of the outer loop 5 determining the primary target value SIRc to be fed to the inner loop.

The service selection and/or primary target value determination phases can be effected periodically or on demand (on receiving a specific instruction). In the former case, the selection and determination phase periods can be the same or different. If they are different, it is preferable for the frequency of the determination phase to be greater than that of the selection phase, to prevent the outer loop 5 from diverging.

The invention is not limited to the embodiments of the device, equipment, base station, controller and method described above by way of example only, but encompasses all variants within the scope of the following claims that the person skilled in the art might envisage.

Thus a two-stage outer loop coupled to the control module of the device has been described by way of example. The invention nevertheless applies to any type of two-stage outer loop, regardless of how it is implemented, and to any type of outer loop, regardless of which type of inner loop is used.

Moreover, the invention applies to any type of quality indicator, whether it is directly or indirectly representative of a quality of service.

The invention claimed is:

1. A method of controlling an outer loop for controlling the adjustment of a primary target value of an inner power control loop in a telecommunications installation, said outer loop feeding said inner loop with a primary target value corresponding to a service, the method comprising, if there are at least two different services in said installation, selecting one service of the at least two different services dynamically and as a function of a selected criterion so that said outer loop can determine a primary target value corresponding to the selected service, wherein said selecting comprises selecting, from among services that have not achieved an associated target quality of service, a service that has a largest difference between an associated estimated quality of service and the associated target quality of service.

2. The method according to claim 1, wherein each service is associated with at least one tertiary target value and at least one associated tertiary quality indicator and said selection criterion for each service that has not achieved its target quality of service consists in calculating a difference between its tertiary target value and its tertiary quality indicator for each service and retaining the service having a largest difference.

3. The method according to claim 2, wherein each tertiary target value is representative of a target quality of service and each tertiary quality indicator is representative of an estimated quality of service.

4. The method according to claim 1, further comprising said outer loop determining said primary target value corresponding to said selected service.

5. The method according to claim 4, wherein said outer loop determines said primary target value from first and second secondary quality indicators respectively associated with first and second secondary target values representative of said primary target value.

6. The method according to claim 1, wherein said outer loop determines the primary target value periodically.

7. The method according to claim 1, wherein said service is selected on demand.

8. The method according to claim 6, wherein said service is selected periodically.

9. The method according to claim 8, wherein a service selection period and a primary target value determination period are different.

10. The method according to claim 9, wherein said determination period is greater than said selection period.

11. The method according to claim 2, wherein said secondary and tertiary quality indicators are selected from a group including bit error rates, block error rates and raw bit error rates.

12. The method according to claim 1, wherein the primary target value is the signal-to-interference ratio.

13. A device for controlling an outer loop for controlling the adjustment of a primary target value of an inner power control loop in a telecommunications installation, said external control loop being adapted to feed the inner loop with the primary target value corresponding to a service, the device comprising control means adapted, if there are at least two different services in the installation, to select one service of the at least two different services dynamically and as a function of a selected criterion so that said outer loop can determine a primary target value corresponding to the selected service wherein said control means selects, from among services that have not achieved an associated target quality of service, a service that has a largest difference between an associated estimated quality of service and the associated target quality of service.

14. The device according to claim 13, wherein each service is associated with at least one tertiary target value and at least one associated tertiary quality indicator and said control means are adapted to effect said selection on the basis of a selection criterion for each service that has not achieved its target quality of service consisting in calculating a difference between its tertiary target value and its tertiary quality indicator and retaining the service having a largest difference.

15. The device according to claim 14, wherein each tertiary target value is representative of a target quality of service and each tertiary quality indicator is representative of an estimated quality of service.

16. The device according to claim 13, wherein said control means are adapted to deliver information representative of the selected service to an outer loop using first and second secondary quality indicators respectively associated with first and second secondary target values representative of said primary target value.

17. The device according to claim 13, wherein it includes said outer loop.

18. The device according to claim 13, characterized in that said outer loop determines the primary target value periodically.

19. The device according to claim 13, wherein said control means are adapted to effect said service selection on demand.

20. The device according to claim 13, wherein said control means are adapted to effect said service selection periodically.

21. The device according to claim 18, wherein the service selection and primary target value determination periods are different.

22. The device according to claim 21, wherein said determination period is greater than said selection period.

23. The device according to claim 14, wherein said secondary and tertiary quality indicators are selected from a group including bit error rates, block error rates and raw bit error rates.

24. The method according to claim 14, wherein the primary target value is the signal-to-interference ratio.

25. A mobile station comprising device for controlling an outer loop for controlling the adjustment of a primary target value of an inner power control loop in a telecommunications installation, said external control loop being adapted to feed the inner loop with the primary target value corresponding to a service, the device comprising control means adapted, if there are at least two different services in the installation, to select one service of the at least two different services dynamically and as a function of a selected criterion so that said outer loop can determine a primary target value corresponding to the selected service, wherein said control means selects, from among services that have not achieved an associated target quality of service, a service that has a largest difference between an associated estimated quality of service and the associated target quality of service.

26. A telecommunications network equipment comprising device for controlling an outer loop for controlling the adjustment of a primary target value of an inner power control loop in a telecommunications installation, said external control loop being adapted to feed the inner loop with the primary target value corresponding to a service, the device comprising control means adapted, if there are at least two different services in the installation, to select one service of the at least two different services dynamically and as a function of a selected criterion so that said outer loop can determine a primary target value corresponding to the selected service, wherein said control means selects, from among services that have not achieved an associated target quality of service, a service that has a largest difference between an associated estimated quality of service and the associated target quality of service.

* * * * *